(12) United States Patent
Kelly-Rowley et al.

(10) Patent No.: US 8,779,057 B2
(45) Date of Patent: Jul. 15, 2014

(54) DYE-ENCAPSULATED DISPERSIONS SUITABLE FOR PRINTING APPLICATIONS

(75) Inventors: Anne M. Kelly-Rowley, Midland, MI (US); Timothy J. Young, Bay City, MI (US)

(73) Assignee: Dow Global Technologies LLC, Midland, MI (US)

( * ) Notice: Subject to any disclaimer, the term of this patent is extended or adjusted under 35 U.S.C. 154(b) by 74 days.

(21) Appl. No.: 13/295,787

(22) Filed: Nov. 14, 2011

(65) Prior Publication Data

US 2013/0123385 A1    May 16, 2013

(51) Int. Cl.
| | |
|---|---|
| *B01F 17/00* | (2006.01) |
| *B32B 27/06* | (2006.01) |
| *B32B 27/36* | (2006.01) |
| *B41J 2/01* | (2006.01) |
| *B41J 2/17* | (2006.01) |
| *B41J 2/175* | (2006.01) |
| *B41M 5/00* | (2006.01) |
| *C08G 63/60* | (2006.01) |
| *C08K 9/00* | (2006.01) |
| *C08L 67/00* | (2006.01) |
| *C09D 5/00* | (2006.01) |
| *C09D 11/00* | (2014.01) |
| *G01D 11/00* | (2006.01) |

(52) U.S. Cl.
    USPC .................. 524/599; 347/1; 347/85; 347/95; 347/100; 428/32.1; 428/480; 523/160; 523/161; 523/200; 523/205; 523/206; 524/601

(58) Field of Classification Search
    USPC .......... 523/160, 161, 200, 205, 206; 524/599, 524/601; 347/1, 85, 95, 100; 428/32.1, 480
    See application file for complete search history.

(56) References Cited

U.S. PATENT DOCUMENTS

| | | |
|---|---|---|
| 4,599,392 A | 7/1986 | McKinney et al. |
| 4,988,781 A | 1/1991 | McKinney et al. |
| 5,938,437 A | 8/1999 | DeVincenzo |
| 6,384,108 B1 | 5/2002 | Breton et al. |
| 2003/0144376 A1 | 7/2003 | Vincent et al. |
| 2007/0129463 A1 | 6/2007 | Ma et al. |
| 2008/0024575 A1 | 1/2008 | Yue et al. |
| 2008/0171282 A1 | 7/2008 | Urabe et al. |
| 2008/0262141 A1 | 10/2008 | Cser |
| 2009/0025601 A1 | 1/2009 | Vasudevan et al. |

FOREIGN PATENT DOCUMENTS

| | | |
|---|---|---|
| EP | 1331253 A1 | 7/2003 |
| EP | 1333063 A2 | 8/2003 |
| EP | 2219081 A2 | 8/2010 |
| JP | 09217030 A | 8/1997 |
| JP | 2000034430 | 2/2000 |

OTHER PUBLICATIONS

Machine English translation of JP 09-217030, Sakuma et al., Aug. 1997.*
PCT/US2012/064776 International Search Report and Written Opinion.

* cited by examiner

*Primary Examiner* — Patrick Niland

(57) ABSTRACT

The instant invention provides dye-encapsulated dispersions suitable for printing applications, method of producing the same, ink compositions made therefrom, delivery systems for such ink compositions, and articles having a coating layer derived from such ink compositions.

1 Claim, 6 Drawing Sheets

DYE-ENCAPSULATED DISPERSIONS SUITABLE FOR PRINTING APPLICATIONS

FIELD OF INVENTION

The instant invention relates to dye-encapsulated dispersions suitable for printing applications, method of producing the same, ink compositions made therefrom, delivery systems for such ink compositions, and articles having a coating layer derived from such ink compositions.

BACKGROUND OF THE INVENTION

Ink compositions are typically comprised of a vehicle containing one or more co-solvents, one or more surfactants, one or more binders, and/or one or more colorants. The colorants in ink compositions can be either dyes or pigments depending on the application requirements. Dyes typically have more brilliant colors and are easier to formulate into ink compositions suitable for high image quality and gloss. However, applications requiring durability such as water-fastness and light-fastness typically contain pigments. Pigment dispersions at the required average volume particle size diameter of 0.1 to 0.15 μm are costly due to pigment grinding, and present formulation challenges to obtain high image quality. Gloss uniformity is a particular challenge with pigmented ink compositions. Additional binders, such as latex dispersions or soluble binders, are employed to help further improve the durability of pigmented ink compositions. However, the introduction of such binders into pigmented ink compositions translates into complex ink systems including both a pigment dispersion and a binder, requiring additional costs associated therewith to produce such complex ink systems.

Therefore there is a need for an aqueous dye-encapsulated dispersion suitable for printing applications, method of producing the same, ink compositions made therefrom, delivery systems for such ink compositions, and articles having a coating layer derived from such ink compositions.

SUMMARY OF THE INVENTION

The instant invention provides dye-encapsulated dispersions suitable for printing applications, method of producing the same, ink compositions made therefrom, delivery systems for such ink compositions, and articles having a coating layer derived from such ink compositions.

The dye-encapsulated dispersions suitable for printing applications according to the present invention comprise the melt kneading product of: (a) from 60 to 97 percent by weight of one or more linear or branched polyesters, based on the total solid content of dispersion, having an acid number in the range of less than 30 mg KOH/g resin, a $M_w$ in the range of from 4,000 to 100,000, a glass transition temperature $T_g$ in the range of from 50 to 75° C., and a hydroxyl number in the range of less than 50; (b) from 3 to 40 percent by weight one or more water insoluble dyes, based on the total solid content of the dispersion, wherein said one or more water insoluble dyes are miscible in the one or more linear or branched polyesters; (c) one or more stabilizing agents; and (d) in the presence of water and optionally one or more neutralizing agents; wherein said dye-encapsulated dispersion has an average volume particle size in the range of from 0.05 to 0.5 micrometer, a total solid content in the range of from 15 to 65 percent based on the total weight of the dispersion.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

DETAILED DESCRIPTION OF THE INVENTION

Figure 1:
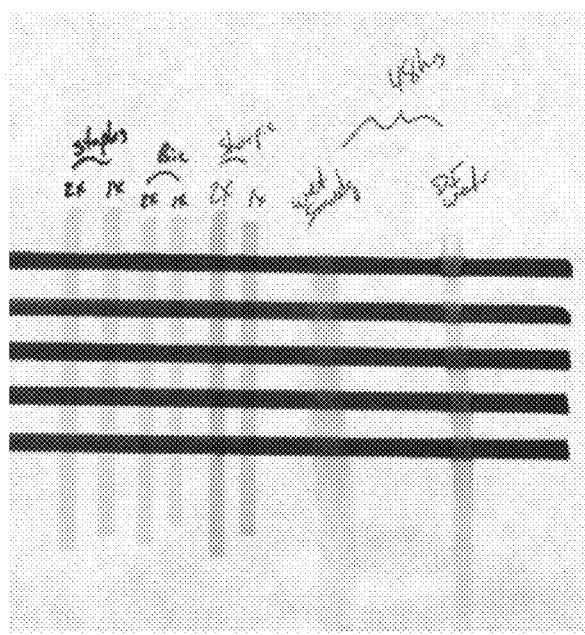
FIG. 1 is a photograph of the Comparative Print Sample 1 comprising a coating layer derived from Comparative Ink Composition 1.
Figure 2:
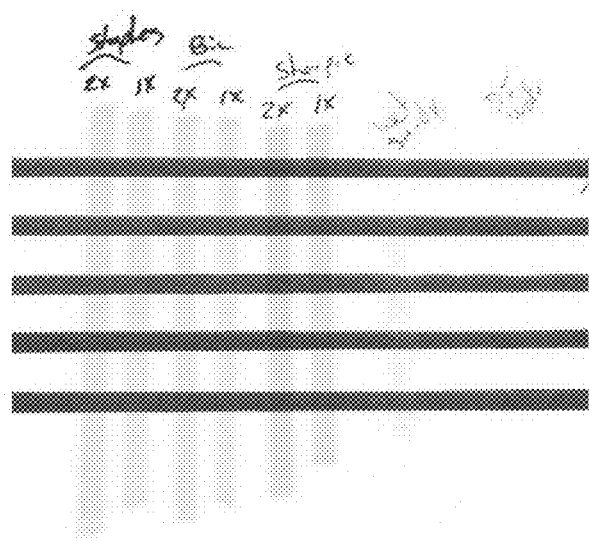
FIG. 2 is a photograph of the Inventive Print Sample 2 comprising a coating layer derived from Inventive Ink Composition 2.
Figure 3:
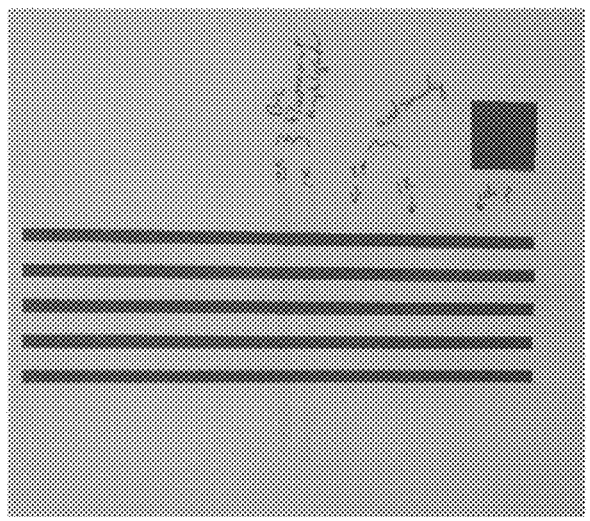
FIG. 3 a photograph of the Comparative Print Sample 2 comprising a coating layer derived from Comparative Ink Composition 2.
Figure 4:
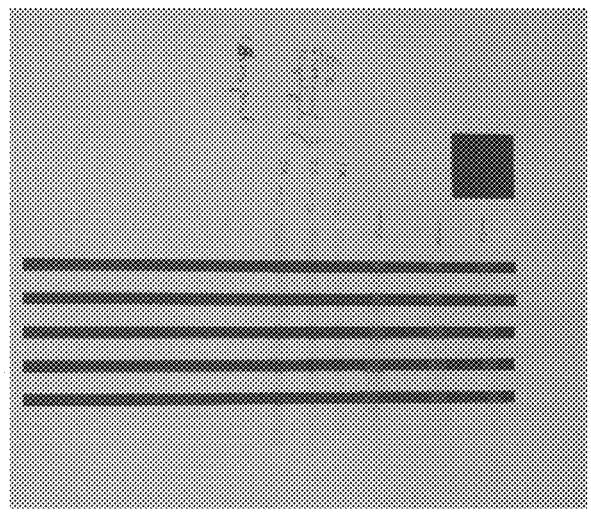
FIG. 4 a photograph of the Comparative Print Sample 3 comprising a coating layer derived from Comparative Ink Composition 3.
Figure 5:
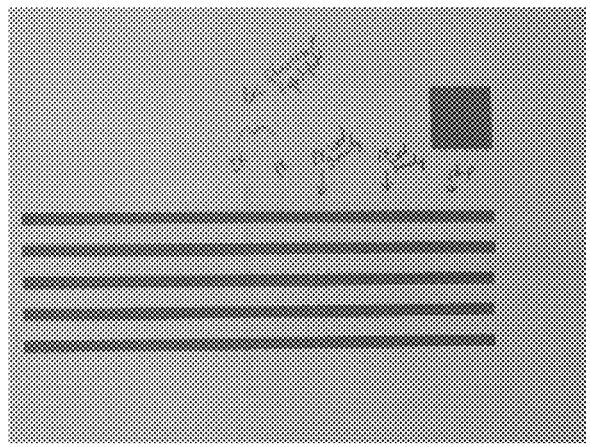
FIG. 5 a photograph of the Inventive Print Sample 1 comprising a coating layer derived from Inventive Ink Composition 1.
Figure 6:
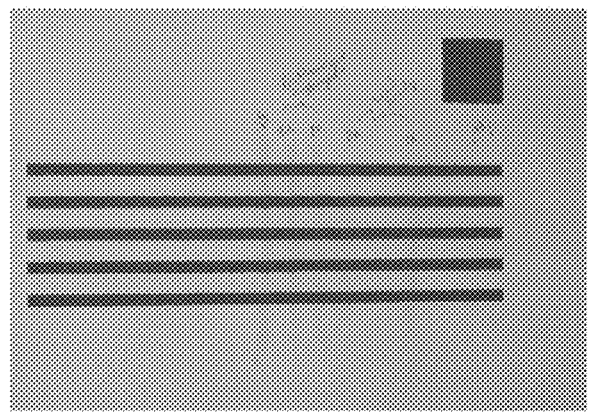
FIG. 6 a photograph of the Inventive Print Sample 3 comprising a coating layer derived from Inventive Ink Composition 4.

The instant invention provides aqueous dye-encapsulated dispersions suitable for printing applications, method of producing the same, ink compositions made therefrom, delivery systems for such ink compositions, and articles having a coating layer derived from such ink compositions.

In one embodiment, the instant invention provides dye-encapsulated dispersions suitable for printing applications comprising the melt kneading product of: (a) from 60 to 97 percent by weight of one or more linear or branched polyesters, based on the total solid content of the dispersion, having an acid number in the range of less than 30 mg KOH/g resin, a $M_w$ in the range of from 4,000 to 100,000, a glass transition temperature $T_g$ in the range of from 50 to 75° C., and a hydroxyl number in the range of less than 50; (b) from 3 to 40 percent by weight one or more water insoluble dyes, based on the total solid content of the dispersion, wherein the one or more water insoluble dyes are miscible in the one or more linear or branched polyesters; (c) optionally one or more stabilizing agents; and (d) in the presence of water and optionally one or more neutralizing agents; wherein the dye-encapsulated dispersion has an average volume particle size diameter in the range of from 0.05 to 0.5 micrometer, a total solid content in the range of from 15 to 65 percent based on the total weight of the dispersion.

In an alternative embodiment, the instant invention further provides a method for producing a dye-encapsulated dispersion suitable for printing applications comprising the steps of: (1) selecting one or more linear or branched polyesters having an acid number in the range of less than 30 mg KOH/gresin, a $M_w$ in the range of from 4,000 to 100,000, a glass transition temperature $T_g$ in the range of from 50 to 75° C., and a hydroxyl number in the range of less than 50; (2) selecting one or more water insoluble dyes, wherein the one or more water insoluble water dyes are miscible in the one or more linear or branched polyesters; (3) optionally selecting one or more stabilizing agents; (4) melt kneading the one or more linear or branched polyesters, one or more water insoluble dyes and optionally one or more stabilizing agents in the presence of water and optionally one or more neutralizing agents; (5) thereby forming an emulsion mixture; (6) diluting the emulsion mixture with additional water and optionally removing heat therefrom; and (7) thereby forming solid particles dispersed in water; wherein the dye-encapsulated dispersion has an average volume particle size in the range of from 0.05 to 0.5 micrometer, a total solid content in the range of from 15 to 65 weight percent based on the total weight of the dispersion, and wherein the dispersion comprises 60 to 97 percent by weight of one or more linear or branched polyesters and 3 to 40 percent by weight of one or more water insoluble dyes, based on the weight of total solid content.

In another alternative embodiment, the instant invention further provides an ink composition comprising the dye-encapsulated dispersion suitable for printing applications, as described above; one or more solvents; one or more surface active agents; optionally one or more biocides; optionally one or more buffers; optionally one or more anti-coagulation additives; optionally one or more binders; optionally one or more colorants; and optionally additional water.

In another alternative embodiment, the instant invention further provides an ink delivery system comprising a housing, and the ink composition, as described above, disposed in the housing.

In another alternative embodiment, the instant invention further provides a printed article comprising a substrate and an ink coating layer derived from the ink composition, as described above, associated with at least one surface of the substrate.

The dye-encapsulated dispersions suitable for printing applications has an average volume particle size diameter in the range of from 0.05 to 0.5 micrometer, for example, from 0.07 to 0.4 micrometer, or from 0.07 to 0.3 micrometer, or from 0.07 to 0.2 micrometer. The dye-encapsulated dispersions suitable for printing applications has a total solid content in the range of from 15 to 65, for example, from 15 to 50, weight percent, based on the total weight of the dispersion. The dye-encapsulated dispersions suitable for printing applications has a pH in the range of from 7 to 9, for example, 7 to 8.5.

One or More Linear or Branched Polyesters

The dye-encapsulated dispersions suitable for printing applications according to the present invention comprise from 60 to 90, for example from 65 to 85, or from 65 to 75, percent by weight of units derived from one or more linear or branched polyesters, based on the total solid content of the dispersion. The one or more linear or branched polyesters according to the present invention have an acid number in the range of less than 30 mg KOH/g resin, for example, less than 27 mg KOH/g resin, or less than 25 mg KOH/g resin. The one or more linear or branched polyesters according to the present invention have a number-average molecular weight ($M_w$) in the range of from 4,000 to 100,000, for example, from 14,000 to 82,000. The one or more linear or branched polyesters according to the present invention have a glass transition temperature $T_g$ in the range of from 50 to 75° C., for example, from 55 to 70° C. The one or more linear or branched polyesters according to the present invention have a hydroxyl number in the range of less than 50, for example less than 45, or less than 42. The one or more linear or branched polyesters according to the present invention may be crystalline polyester(s) or amorphous polyester(s). Amorphous polyesters have a softening point of preferably from 90° to 160° C. Illustrative examples of crystalline polyesters include, but not limited to, poly(ethylene-adipate), poly(propylene-adipate), poly(butylene-adipate), poly(pentylene-adipate), poly(hexylene-adipate), poly(octylene-adipate), poly(nonylene-adipate), poly(decylene-adipate), poly(undecylene-adipate), poly(ododecylene-adipate), poly(ethylene-glutarate), poly(propylene-glutarate), poly(butylene-glutarate), poly(pentylene-glutarate), poly(hexylene-glutarate), poly(octylene-glutarate), poly(nonylene-glutarate), poly(decylene-glutarate), poly(undecylene-glutarate), poly(ododecylene-glutarate), poly(ethylene-succinate), poly(propylene-succinate), poly(butylene-succinate), poly(pentylene-succinate), poly(hexylene-succinate), poly(octylene-succinate), poly(nonylene-succinate), poly(decylene-succinate), poly(undecylene-succinate), poly(ododecylene-succinate), poly(ethylene-pimelate), poly(propylene-pimelate), poly(butylene-pimelate), poly(pentylene-pimelate), poly(hexylene-pimelate), poly(octylene-pimelate), poly(nonylene-pimelate), poly(decylene-pimelate), poly(undecylene-pimelate), poly(ododecylene-pimelate), poly(ethylene-sebacate), poly(propylene-sebacate), poly(butylene-sebacate), poly(pentylene-sebacate), poly(hexylene-sebacate), poly(octylene-sebacate), poly(nonylene-sebacate), poly(decylene-sebacate), poly(undecylene-sebacate), poly(ododecylene-sebacate), poly(ethylene-azelate), poly(propylene-azelate), poly(butylene-azelate), poly(pentylene-azelate), poly(hexylene-azelate), poly(octylene-azelate), poly(nonylene-azelate), poly(decylene-azelate), poly(undecylene-azelate), poly(ododecylene-azelate), poly(ethylene-dodecanoate), poly(propylene-dodecanoate), poly(butylene-dodecanoate), poly(pentylene-dodecanoate), poly(hexylene-dodecanoate), poly(octylene-dodecanoate), poly(nonylene-dodecanoate), poly(decylene-dodecanoate), poly(undecylene-dodecanoate), poly(ododecylene-dodecanoate), poly(ethylene-fumarate), poly(propylene-fumarate), poly(butylene-fumarate), poly(pentylene-fumarate), poly(hexylene-fumarate), poly(octylene-fumarate), poly(nonylene-fumarate), poly(decylene-fumarate), poly(undecylene-fumarate), poly(ododecylene fumarate), copoly-(butylene-fumarate)-copoly-(hexylene-fumarate), copoly-(ethylene-dodecanoate)-copoly-(ethylene-fumarate), mixtures thereof, and the like. The crystalline resin may be derived from monomers selected from, for example, organic diols and diacids in the presence of a polycondensation catalyst.

Additional examples of polyester based crystalline resins include, but are not limited to, alkali copoly(5-sulfoisophthaloyl)-co-poly(ethylene-adipate), alkali copoly(5-sulfoisophthaloyl)-copoly(propylene-adipate), alkali copoly(5-sulfoisophthaloyl)-copoly(butylene-adipate), alkali copoly(5-sulfo-isophthaloyl)-copoly(pentylene-adipate), and alkali copoly(5-sulfo-iosphthaloyl)-copoly(octylene-adipate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-co-poly(butylene-adipate), alkali copoly(5-sulfo-isophthaloyl)-copoly(pentylene-adipate), alkali copoly(5-sulfo-isopthaloyl)-copoly(hexylene-adipate), alkali copoly(5-sulfo-isophthaloyl)-copoly(octylene-adipate), alkali copoly(5-sulfoisophthaloyl)-copoly(ethylene-succinate), alkali copoly(5-sulfoisophthaloyl-copoly(butylene-succinate), alkali copoly(5-sulfoisophthaloyl)-copoly(hexylene-succinate), alkali copoly(5-sulfoisophthaloyl)-copoly(octylene-succinate), alkali copoly(5-sulfo-isophthaloyl)-copoly(ethylene-sebacate), alkali copoly(5-sulfo-isophthaloyl)-copoly(propylene-sebacate), alkali copoly(5-sulfo-isophthaloyl)-copoly(butylene-sebacate), alkali copoly(5-sulfo-isophthaloyl)-copoly(pentylene-sebacate), alkali copoly(5-sulfo-isophthaloyl)-copoly(hexylene-sebacate), alkali copoly(5-sulfo-isophthaloyl)-copoly(octylene-sebacate), alkali copoly(5-sulfo-isophthaloyl)-copoly(ethylene-adipate), alkali copoly(5-sulfo-isophthaloyl)-copoly(propylene-adipate), alkali copoly(5-sulfo-iosphthaloyl)-copoly(butylene-adipate), alkali copoly(5-sulfo-isophthaloyl)-copoly(pentylene-adipate), alkali copoly(5-sulfo-isophthaloyl)

copoly(hexylene-adipate), and/or poly(octylene-adipate), and wherein alkali is a metal like sodium, lithium or potassium.

Illustrative examples of amorphous polyesters include, for example poly(1,2-propylene-diethylene)terephthalate, polyethyleneterephthalate, polypropylene-terephthalate, polybutylene-terephthalate, polypentylene-terephthalate, polyhexylene-terephthalate, polyheptadene-terephthalate, polyoctalene-terephthalate, polyethylene-sebacate, polypropylene-sebacate, polybutylene-sebacate, polyethylene-adipate, polypropylene-adipate, polybutylene-adipate, polypentylene-adipate, polyhexylene-adipate polyheptadene-adipate, polyoctalene-adipate, polyethylene-glutarate, polypropylene-glutarate, polybutylene-glutarate, polypentylene-glutarate, polyhexylene-glutarate, polyheptadene-glutarate, polyoctalene-glutarate, polyethylene-pimelate, polypropylene-pimelate, polybutylene-pimelate, polypentylene-pimelate, polyhexylene-pimelate, polyheptadene-pimelate, poly(propoxylated bisphenol co-fumarate), poly (ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly (ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly (ethoxylated bisphenol co-itaconate), poly(butyloxylated bisphenol co-itaconate), poly(co-propoxylated bisphenol co-ethoxylated bisphenol co-itaconate), and/or poly(1,2-propylene itaconate).

In embodiments, the linear or branched amorphous polyester is an alkali sulfonated polyester resin. Examples of suitable alkali sulfonated polyester resins include, but are not limited to, the metal or alkali salts of copoly(ethylene-terephthalate)-copoly-(ethylene-5-sulfo-isophthalate), copoly(propylene-terephthalate)-copoly(propylene-5-sulfo-isophthalate), copoly(diethylene-terephthalate)-copoly(diethylene-5-sulfo-isophthalate), copoly(propylene-diethylene-terephthalate)-copoly(propylene-diethylene-5-sulfo-isophthalate), copoly(propylene-butylene-terephthalate)-copoly propylene-butylene-5-sulfo-isophthalate), copoly (propoxylated bisphenol-A-fumarate)-copoly(propoxylated bisphenol A-5-sulfo-isophthalate), copoly(ethoxylated bisphenol-A-fumarate)-copoly(ethoxylated bisphenol-A-5-sulfo-isophthalate), and/or copoly(ethoxylated bisphenol-A-maleate)-copoly(ethoxylated bisphenol-A-5-sulfo-isophthalate), and wherein the alkali metal is, for example, a sodium, lithium or potassium ion.

Additional illustrative examples of amorphous polyesters include, but are not limited to, polyethylene-sebacate, polypropylene sebacate, polybutylene-sebacate, polyethylene-adipate, polypropylene-adipate, polybutylene-adipate, polypentylene-adipate, polyhexylene-adipate, polyheptadene-adipate, polyoctalene-adipate, polyethylene-glutarate, polypropylene-glutarate, polybutylene-glutarate, polypentylene-glutarate, polyhexylene-glutarate, polyheptadene-glutarate, polyoctalene-glutarate polyethylene-pimelate, polypropylene-pimelate, polybutylene-pimelate, polypentylene-pimelate, polyhexylene-pimelate, polyheptadene-pimelate, poly(propoxylated bisphenol-fumarate), poly(propoxylated bisphenol-succinate), poly(propoxylated bisphenol-adipate), poly(propoxylated bisphenol-glutarate), and those commercially available under the tradenames SPAR™ (Dixie Chemicals), BECKOSOL™ (Reichhold Inc), ARAKOTE™ (Ciba-Geigy Corporation), HETRON™ (Ashland Chemical), PARAPLEX™ (The Dow Chemical Company), POLYLITE™ (Reichhold Inc), PLASTHALL™ (The Dow Chemical Company), CYGAL™ (American Cyanamide), ARMCO™ (Armco Composites), ARPOL™ (Ashland Chemical), CELANEX™ (Celanese Eng), RYNITE™ (DuPont), STYPOL™ (Freeman Chemical Corporation), FINETONE™ (Reichhold Inc.), and mixtures thereof and the like. The resins may also be functionalized, such as being carboxylated, sulfonated, or the like, such as sodio sulfonated. The amorphous resins may be linear or branched. The amorphous resin may possess various onset glass transition temperatures ($T_g$) of from about 40° C. to about 80° C., such as from about 50° C. to about 70° C., as measured by differential scanning calorimetry (DSC).

Other illustrative polyesters may be obtainable by polycondensing an alcohol component and a carboxylic acid component wherein the carboxylic acid component contains a fumaric acid-modified rosin.

Water Insoluble Dye

The dye-encapsulated dispersion suitable for printing applications comprises from 3 to 40, for example, from 5 to 40, or from 10 to 40, or from 10 to 35, or from 10 to 30, percent by weight of one or more (water insoluble) solvent/oil soluble dyes. Such (water insoluble) solvent/oil soluble dyes include, but are not limited to, an azo based dye, a phthalocyanine based dye, an anthraquinone based dye, a metalized based dye, and/or combination of two or more thereof. Exemplary azo based dyes include, but are not limited to, azo chromium metal complex dyes, and azo cobalt metal complex dyes. Exemplary phthalocyanine based dyes include, but are not limited to, copper phthalocyanine metal complex dyes. The one or more (water insoluble) solvent/oil soluble dyes are miscible in the one or more linear or branched polyesters, as described above. Such (water insoluble) solvent/oil soluble dyes are commercially available, for example, under the tradename SAVINYL from Clariant Corporation or ORASOL from BASF. Additional examples of (water insoluble) solvent/oil soluble dyes are disclosed in the U.S. Patent Publication No. 2009/0113640, incorporated herein by reference to the extent that it discloses such (water insoluble) solvent/oil soluble dyes.

Stabilizing Agent

The dye-encapsulated dispersion suitable for printing applications optionally comprises one or more stabilizing agents, also referred to herein as dispersion agents, to promote the formation of a stable dispersion. The stabilizing agent may preferably be an external stabilizing agent.

The dye-encapsulated dispersion suitable for printing applications comprises from less than 50 percent by weight of one or more stabilizing agents, based on the total solid content of the aqueous dispersion; for example, from 1 to 50, or from 1 to 25, or in the alternative from 1 to 35, or in the alternative from 1 to 40, or in the alternative from 1 to 45, percent by weight of one or more stabilizing agents, based on the total solid content of the dispersion. In selected embodiments, the stabilizing agent may be a surfactant, a polymer, or mixtures thereof. In certain embodiments, the stabilizing agent can be a polar polymer, having a polar group as either a comonomer or grafted monomer. In exemplary embodiments, the stabilizing agent comprises one or more polar polyolefins, having a polar group as either a comonomer or grafted monomer. Exemplary polymeric stabilizing agents include, but are not limited to, ethylene-acrylic acid (EAA) and ethylene-methacrylic acid copolymers, such as those available under the trademarks PRIMACOR™, commercially available from The Dow Chemical Company, NUCREL™, commercially available from E.I. DuPont de Nemours, and ESCOR™, commercially available from ExxonMobil Chemical Company and described in U.S. Pat. Nos. 4,599,392, 4,988,781, and 5,938,437, each of which is incorporated herein by reference in its entirety. Other exemplary polymeric stabilizing agents include, but are not limited to, ethylene ethyl acrylate (EEA), ethylene methyl methacrylate (EMMA), and ethylene butyl acrylate (EBA). Other ethylene-carboxylic acid copolymers may also be used. Other stabilizing agents that may be used include, but are not limited to, long chain fatty acids, fatty acid salts, or fatty acid alkyl esters having from 12 to 60 carbon atoms. In other embodiments, the long chain fatty acid or fatty acid salt may have from 12 to 40 carbon atoms.

The stabilizing agent may be partially or fully neutralized with a neutralizing agent. In certain embodiments, neutralization of the stabilizing agent, such as a long chain fatty acid or EAA, may be from 25 to 200 percent on a molar basis; or in the alternative, it may be from 50 to 110 percent on a molar basis. For example, for EAA, the neutralizing agent may be a base, such as ammonium hydroxide or potassium hydroxide, for example. Other neutralizing agents can include lithium hydroxide or sodium hydroxide, for example. In another alternative, the neutralizing agent may, for example, be a carbonate. In another alternative, the neutralizing agent may, for example, be any amine such as monoethanolamine, or 2-amino-2-methyl-1-propanol (AMP). Amines useful in embodiments disclosed herein may include monoethanolamine, diethanolamine, triethanolamine, and TRIS AMINO (each available from Angus), NEUTROL TE (available from BASF), as well as triisopropanolamine, diisopropanolamine, and N,N-dimethylethanolamine (each available from The Dow Chemical Company, Midland, Mich.). Other useful amines may include ammonia, monomethylamine, dimethylamine, trimethylamine, monoethylamine, diethylamine, triethylamine, mono-n-propylamine, dimethyl-n propylamine, N-methanol amine, N-aminoethylethanolamine, N-methyldiethanolamine, monoisopropanolamine, N,N-dimethyl propanolamine, 2-amino-2-methyl-1-propanol, tris(hydroxymethyl)-aminomethane, N,N,N'N'-tetrakis(2-hydroxylpropyl) ethylenediamine, 1.2-diaminopropane. In some embodiments, mixtures of amines or mixtures of amines and surfactants may be used.

Additional stabilizing agents that may be useful in the practice of the present invention include, but are not limited to, cationic surfactants, anionic surfactants, or non-ionic surfactants, or combinations thereof. Examples of anionic surfactants include, but are not limited to, sulfonates, carboxylates, and phosphates. Examples of cationic surfactants include, but are not limited to, quaternary amines. Examples of non-ionic surfactants include, but are not limited to, block copolymers containing ethylene oxide and silicone surfactants. Stabilizing agents useful in the practice of the present invention can be either external surfactants or internal surfactants. External surfactants are surfactants that do not become chemically reacted into the base polymer during dispersion preparation. Examples of external surfactants useful herein include, but are not limited to, salts of dodecyl benzene sulfonic acid and lauryl sulfonic acid salt. Internal surfactants are surfactants that do become chemically reacted into the base polymer during dispersion preparation. An example of an internal surfactant useful herein includes 2,2-dimethylol propionic acid and its salts. Various commercially available surfactants may be used in embodiments disclosed herein, including: OP-100 (a sodium stearate), OPK-1000 (a potassium stearate), and OPK-181 (a potassium oleate), each available from RTD Hallstar; UNICID 350, available from Baker Petrolite; DISPONIL FES 77-IS and DISPONIL TA-430, each available from Cognis; RHODAPEX CO-436, SOPROPHOR 4D384, 3D-33, and 796/P, RHODACAL BX-78 and LDS-22, RHODAFAC RE-610, and RM-710, and SUPRAGIL MNS/90, each available from Rhodia; and TRITON QS-15, TRITON W-30, DOWFAX 2A1, DOWFAX 3B2, DOWFAX 8390, DOWFAX C6L, TRITON X-200, TRITON XN-455, TRITON H-55, TRITON GR-5M, TRITON BG-10, and TRITON CG-110, each available from The Dow Chemical Company, Midland, Mich.

In one embodiment, two or more of the above described stabilizing agents may be employed.

Fluid Medium

The dye-encapsulated dispersion suitable for printing applications further comprises a fluid medium. The fluid medium is water. The dye-encapsulated dispersion suitable for printing applications comprises from 35 to 80, for example, from 35 to 65, percent by weight of water based on the weight of the dye-encapsulated dispersion suitable for printing applications.

Forming the Dispersion

The dispersion can be formed by any number of methods recognized by those having skill in the art. In one embodiment, one or more linear or branched polyesters, one or more (water insoluble) solvent/oil soluble dyes, and optionally one or more stabilizing agents are melt-kneaded in the presence of water and optionally a neutralizing agent, such as ammonia, potassium hydroxide, sodium hydroxide, or a combination thereof to form an emulsified mixture. The emulsified mixture is then diluted with additional water while, optionally, heat is removed from the emulsified mixture to form solid polymeric particles dispersed in water; thus, forming a dispersion having a water content of greater than 25 weight percent, e.g. 35 to 80 weight percent based on the weight of the dispersion, and a solid content in the range of from 20 to 65, for example 35 to 55, weight percent based on the weight of the dispersion.

Any melt-kneading means known in the art may be used. In some embodiments, a kneader, a BANBURY® mixer, single-screw extruder, or a multi-screw extruder, e.g. a twin screw extruder, is used. A process for producing the dispersions in accordance with the present invention is not particularly limited. For example, an extruder, in certain embodiments, for example, a twin screw extruder, is coupled to a back pressure regulator, melt pump, or gear pump. Exemplary embodiments also provide a base reservoir and an initial water reservoir, each of which includes a pump. Desired amounts of base and initial water are provided from the base reservoir and the initial water reservoir, respectively. Any suitable pump may be used. In some embodiments, the base and initial water are preheated in a preheater.

In one embodiment, one or more linear or branched polyesters, one or more (water insoluble) solvent/oil soluble dyes, and optionally one or more stabilizing agents are melt-kneaded in the presence of water and optionally a neutralizing agent, such as ammonia, potassium hydroxide, sodium hydroxide, or a combination thereof in an extruder to form an emulsified mixture. The emulsified mixture is then diluted with additional water while, optionally, heat is removed from the emulsified mixture to form solid polymeric particles dispersed in water; thus, forming a dispersion having a water content of greater than 25 weight percent, e.g. 35 to 80 weight percent, based on the weight of the dispersion, and a solid content in the range of from 20 to 65, for example 35 to 55, weight percent based on the weight of the dispersion.

In one embodiment, one or more linear or branched polyesters, one or more (water insoluble) solvent/oil soluble dyes are melt kneaded in an extruder, and then conveyed into a rotor stator mixer, e.g. Oakes mixer, to form an emulsified mixture in the presence of water and optionally one or more stabilizing agents and optionally one or more neutralizing agents, such as ammonia, potassium hydroxide, sodium hydroxide, or combinations thereof. The emulsified mixture is then diluted with additional water while, optionally, heat is removed from the emulsified mixture to form solid polymeric particles dispersed in water; thus, forming a dispersion having a water content of greater than 25 weight percent, e.g. 35 to 80 weight percent based on the weight of the dispersion, and a solid content in the range of from 15 to 65, for example 15 to 50, weight percent based on the weight of the dispersion.

In one embodiment, one or more linear or branched polyesters, one or more (water insoluble) solvent/oil soluble dyes are melt blended in a heated tank, and then conveyed into a rotor stator mixer, e.g. Oakes mixer, to form an emulsified mixture in the presence of water and optionally one or more stabilizing agents and optionally one or more neutralizing agents, such as ammonia, potassium hydroxide, sodium hydroxide, or combinations thereof. The emulsified mixture is then diluted with additional water while, optionally, heat is removed from the emulsified mixture to form solid polymeric particles dispersed in water; thus, forming a dispersion having a water content of greater than 25 weight percent, e.g. 35 to 85 weight percent based on the weight of the dispersion, and a solid content in the range of from 15 to 65, for example 15 to 50, weight percent based on the weight of the dispersion.

In an alternative embodiment, the instant invention further provides a method for producing a dye-encapsulated dispersion suitable for printing applications comprising the steps of: (1) selecting one or more linear or branched polyesters having an acid number in the range of less than 30 mg KOH/g resin, a $M_w$ in the range of from 4,000 to 100,000, a glass transition temperature $T_g$ in the range of from 50 to 75° C., and a hydroxyl number in the range of less than 50; (2) selecting one or more water insoluble dyes, wherein the one or more water insoluble water dyes are miscible in the one or more linear or branched polyesters; (3) selecting one or more stabilizing agents; (4) melt kneading the one or more linear or branched polyesters, one or more water insoluble dyes and optionally one or more stabilizing agents in the presence of water and optionally one or more neutralizing agents; (5) thereby forming an emulsified mixture; (6) diluting the emulsified mixture with additional water and optionally removing heat therefrom; and (7) thereby forming solid particles dispersed in water; wherein said dye-encapsulated dispersion has an average volume particle size diameter in the range of from 0.05 to 0.5 micrometer, for example, from 0.07 to 0.4 micrometer, or from 0.07 to 0.3 micrometer, or from 0.07 to 0.2 micrometer, a total solid content in the range of from 15 to 65, for example from 15 to 50, percent based on the total weight of the dispersion, and wherein the total solid content comprises 60 to 90 percent by weight of one or more linear or branched polyesters and 10 to 40 percent by weight of one or more water insoluble dyes, based on the weight of total solid content.

The aqueous dye-encapsulated dispersions of the present invention may further be formulated into ink compositions. Such ink compositions may further include one or more components including, but not limited to, one or more solvents, one or more co-solvents, one or more sequestering agents, one or more surface active agents, optionally one or more biocides, optionally one or more buffers, optionally one or more anti-coagulation additives, optionally one or more binders, optionally one or more colorants, and optionally additional water. Such additional one or more components are further described in the U.S. Patent Publication No. 2007/0129463, incorporated by reference to the extent that it discloses such additional components.

The ink compositions of the present invention may be housed in a housing to form an ink delivery system. The ink composition is generally disposed in the housing, and the delivery system further provides an interface for printing on a substrate. In one embodiment, the ink delivery system is a pen, and in another embodiment, the ink delivery system is an ink cartridge, e.g. ink jet cartridge, or an ink array suitable to be part of a printing device, e.g. printer.

In another alternative embodiment, the instant invention further provides a printed article comprising a substrate and an ink layer coating derived from the ink composition, as described above, associated with at least one surface of the substrate. Such substrates include, but are not limited to, cellulosic based materials (paper based materials), materials coated with porous substances, wood, textile materials, polymeric materials, metals, and/or combinations thereof. The ink composition may be deposited on the substrate via any suitable printing technique, such as ink jet printing.

EXAMPLES

The following examples illustrate the present invention but are not intended to limit the scope of the invention. The examples of the instant invention demonstrate that the aqueous dye-encapsulated dispersions of the present invention provide for strong color, improved water-fastness and wet smudge in printing applications.

Description of Formulation Components

Polyester 1 is Finetone T382ES-HMW, a bisphenol-A fumarate (aromatic, linear) polyester with an acid number of 18 mg KOH/g, a Tg of approximately 58° C., $M_w$ of 81,700 and $M_n$ of 7,260, available from Reichhold.

Polyester 2 is Finetone T382ES, a bisphenol-A fumarate (aromatic, linear) polyester with an acid number of 21 mg KOH/g, a Tg of approximately 56° C., $M_w$ of 13,900 and $M_n$ of 4,760, available from Reichhold.

Water Insoluble Dye 1 (Dye-1) is Orasol Red G, a Cobalt containing dye used for coloration available from BASF.

Water Insoluble Dye 2 (Dye-2) is Savinyl Yellow RLS (Solvent Yellow 83:1), which is available from Clariant Corp.

Water Insoluble Dye 3 (Dye-3) is Savinyl Red 3BLS (Solvent Red 91), which is available from Clariant Corp.

Water Insoluble Dye 4 (Dye-4) is Savinyl Blue GLS (Solvent Blue 44), which is available from Clariant Corp.

Stabilizing agent 1 (SA1) is Rhodacal LDS-22 (Sodium dodecylbenzene sulfonate) (22% active), which is available from Rhodia.

Neutralizing agent 1 (NA1) is KOH, 24 W % aqueous solution.

Neutralizing agent 2 (NA2) is NaOH, 25 W % aqueous solution.

Preparation of Inventive Aqueous Dispersion A, B and C

Inventive aqueous dispersion examples A, B and C were prepared according to the following procedure based on the formulation components listed in Table 1. The polyester was pre-mixed with dye, and then the premix was placed into a hot melter. The exit of the melter hose was coupled to the inlet of a rotor stator mixer. The temperature of the hot melter and hose were both set to 175° C. The molten polyester/dye was conveyed at 30 grams/minute into a first rotor stator mixer, and initial water, optional surfactant and neutralizing agent were contacted with the molten polyester/dye to form an emulsified mixture. The emulsified mixture was conveyed into a second rotor stator, and the temperature was lowered to approximately 120° C. while additional dilution water was contacted with the emulsified mixture to form the dispersion. A back-pressure regulator positioned on the outlet of the second rotor stator mixer provided the means to adjust the pressure to a suitable pressure inside the system to prevent steam formation at the operating temperature. The resulting dispersions were cooled and filtered through a 200 micron filter. Inventive aqueous dispersion examples A, B and C were tested for their properties, and the results are reported in Table 1.

Preparation of Inventive Aqueous Dispersion Example D-Z

Inventive aqueous dispersion examples D-Z were prepared according to the following procedure based on the formulation components listed in Table 1. The polyester was premixed with dye, and then the premix was placed into a powder feeder, and melt blended in a single screw extruder. The exit of the extruder was coupled to the inlet of a rotor stator mixer. The molten polyester/dye was conveyed at 30 grams/minute into a first rotor stator mixer, and initial water, optional surfactant and neutralizing agent were contacted with the molten polyester/dye to form an emulsified mixture. The emulsified mixture was conveyed into a second rotor stator, and the temperature was lowered to approximately 120° C. while additional dilution water was contacted with the emulsified mixture to form the dispersion. A back-pressure regulator positioned on the outlet of the second rotor stator mixer provided the means to adjust the pressure to a suitable pressure inside the system to prevent steam formation at the operating temperature. The resulting dispersions were cooled and filtered through a 200 micron filter. Inventive aqueous dispersion examples D-Z were tested for their properties, and the results are reported in Table 1.

TABLE 1

| Inventive Dye Dispersion | Dye ID | Polymer ID | Dye/Polymer Ratio (wt %) | SA1/ (polymer + dye) (g/g) in pph | % IA water | Base solution/(Dye + Polymer) (g/g) in pph | Base ID | Avg Particle size (μm) | Solid Content (%) | 1 to 10,000 dilution absorbance (w/w) | UV-VIS Absorbance Lambda Max (nm) |
|---|---|---|---|---|---|---|---|---|---|---|---|
| A | Dye-1 | Polyester 1 | 30/70 | 11.4 | 30.2 | 4.2 | NA2 | 0.467 | 40.6 | 0.526 | 563 |
| B | Dye-1 | Polyester 1 | 30/70 | 11.4 | 30.2 | 4.2 | NA2 | 0.168 | 40.6 | 0.525 | 563 |
| C | Dye-1 | Polyester 1 | 30/70 | 11.4 | 30.2 | 4.2 | NA2 | 0.164 | 40.6 | 0.456 | 563 |
| D | Dye-2 | Polyester 1 | 30/70 | 4.53 | 48.0 | 3.97 | NA2 | 0.136 | 39.5 | 0.38 | 442 |
| E | Dye-2 | Polyester 1 | 30/70 | 0.0 | 49.0 | 3.97 | NA2 | 0.154 | 40.3 | 0.46 | 444 |
| F | Dye-2 | Polyester 1 | 30/70 | 9.10 | 46.9 | 3.97 | NA2 | 0.141 | 40.2 | 0.36 | 422 |
| G | Dye-2 | Polyester 1 | 15/85 | 0.0 | 49.0 | 3.93 | NA2 | 0.109 | 35.2 | 0.17 | 414 |
| H | Dye-2 | Polyester 1 | 15/85 | 4.53 | 48.0 | 3.93 | NA2 | 0.104 | 35.8 | 0.16 | 415 |
| I | Dye-2 | Polyester 1 | 15/85 | 9.10 | 46.9 | 3.93 | NA2 | 0.106 | 36.1 | 0.19 | 440 |
| J | Dye-4 | Polyester 1 | 15/85 | 0.0 | 44.5 | 3.93 | NA2 | 0.153 | 41.4 | 0.22 | 668 |
| K | Dye-4 | Polyester 1 | 15/85 | 4.53 | 41.5 | 3.93 | NA2 | 0.235 | 40.5 | 0.23 | 668 |
| L | Dye-4 | Polyester 1 | 15/85 | 9.10 | 40.4 | 3.93 | NA2 | 0.215 | 40.2 | 0.22 | 668 |
| M | Dye-3 | Polyester 1 | 30/70 | 0.0 | 61.5 | 4.50 | NA2 | 0.109 | 33.2 | 0.26 | 548 |
| N | Dye-3 | Polyester 1 | 30/70 | 4.53 | 60.5 | 4.50 | NA2 | 0.109 | 36.6 | 0.25 | 546 |
| O | Dye-3 | Polyester 1 | 30/70 | 9.10 | 59.5 | 4.50 | NA2 | 0.078 | 36.4 | 0.24 | 548 |
| P | Dye-3 | Polyester 1 | 13/87 | 0.0 | 49.0 | 4.23 | NA2 | 0.114 | 39.2 | 0.14 | 546 |
| Q | Dye-3 | Polyester 1 | 13/87 | 0.0 | 49.0 | 4.23 | NA2 | 0.210 | 32.5 | 0.11 | 546 |
| R | Dye-3 | Polyester 1 | 13/87 | 4.53 | 47.9 | 4.23 | NA2 | 0.121 | 38.6 | 0.14 | 546 |
| S | Dye-3 | Polyester 1 | 13/87 | 9.10 | 46.9 | 4.23 | NA2 | 0.126 | 37.9 | 0.12 | 549 |
| T | Dye-3 | Polyester 1 | 13/87 | 9.10 | 46.9 | 4.23 | NA2 | 0.105 | 31.6 | 0.12 | 547 |
| U | Dye-3 | Polyester 1 | 13/87 | 9.10 | 46.9 | 4.23 | NA2 | 0.105 | 27.1 | 0.11 | 549 |
| V | Dye-3 | Polyester 1 | 7.5/92.5 | 0.0 | 39.3 | 3.10 | NA2 | 0.140 | 39.8 | 0.11 | 523 |
| W | Dye-3 | Polyester 1 | 3.7/96.3 | 0.0 | 39.3 | 2.97 | NA2 | 0.140 | 38.8 | 0.10 | 555 |
| X | Dye-3 | Polyester 1 | 3.7/96.3 | 4.53 | 38.3 | 2.97 | NA2 | 0.186 | 38.5 | 0.08 | 555 |
| Y | Dye-3 | Polyester 1 | 3.7/96.3 | 9.10 | 37.3 | 2.97 | NA2 | 0.133 | 38.2 | 0.06 | 555 |
| Z | Dye-4 | Polyester 2 | 25/75 | 0 | 55.2 | 8.20 | NA1 | 0.127 | 33.1 | 0.26 | 668 |

Inventive Ink Compositions 1-4

Inventive ink compositions 1-4 are prepared according to the following process, based on the formulation components reported in Table 2. Formulation components listed in Table 2 were admixed to form inventive ink compositions 1-4, according to the following procedure.

(1) The color strength of Inventive Dispersions A-Z were determined via a UV VIS instrument, reported in Table 1;
   a. Instrument: Shimadzu, UV-3101PC spectrophotometer, scanned from 400-900 nm;
   b. The lambda max is the wavelength at which the color absorbance is strongest in the scanned wavelengths. The absorbance value is recorded at a one to ten thousand weight/weight DI water dilution of colorant dispersion. The same dilution was done for commercial inks to determine the amount of dispersion needed for each respective inventive ink composition. The amount of inventive dispersion used was based on the color strength of the dispersion, as determined above, relative to the target absorbance value set by the commercial ink, as shown in Table 3.

(2) A suitable ink vehicle was prepared for each ink composition based on properties thereof by mixing the solvents, co-solvents, surfactants, any other additives and a portion of the de-ionized water together in a beaker and stir until homogeneous;

(3) The ink vehicle was gradually added to the dye-encapsulated dispersion in a nalgene bottle while being agitated;

(4) pH was adjusted, as needed;

(5) Additional de-ionized water was added;

(6) The ink compositions were filtered via a 50 micron nylon mesh.

TABLE 2

| Ink Component: | | CAS Number | Inventive Ink 1 | Inventive Ink 2 | Inventive Ink 3 | Inventive Ink 4 |
|---|---|---|---|---|---|---|
| Inventive Dye Dispersion | Colorant/ Binder | N/A | A | B | C | A |
| Inventive Dye Dispersion Amount (g) | Colorant/ Binder | N/A | 10.69 | 10.71 | 12.34 | 10.69 |
| Diethylene Glycol (g) | Solvent | 111-46-6 | 1.0 | 1.0 | 1.0 | 0 |
| Glycerol ethoxylate (g) | Solvent | 31694-55-0 | 1.0 | 1.0 | 1.0 | 2.5 |
| 2-Pyrrolidone (g) | Solvent | 616-45-5 | 2.0 | 2.0 | 2.0 | 2.2 |
| Glycerol (g) | Solvent | 56-81-5 | 2.0 | 2.0 | 2.0 | 2.0 |
| 1,2-hexanediol (g) | Solvent | 230-029-6 | 2.0 | 2.0 | 2.0 | |
| Surfynol ™ 440 (g) | Surfactant | 9014-85-1 | 0.2 | 0.2 | 0.2 | |
| Zonyl ™ FSO (g) | Surfactant | 65545-80-4 | 0.1 | 0.1 | 0.1 | |
| Tergitol ™ 15-S-7 (g) | Surfactant | 68131-40-8 | 0.2 | 0.2 | 0.2 | |
| Isopropyl alcohol (g) | Co-Solvent | 67-63-0 | | | | 0.5 |
| Neopentyl alcohol (g) | Co-Solvent | 75-84-3 | | | | 0.3 |
| Deionized Water (g) | Fluid Medium | 7732-18-5 | 30.81 | 30.79 | 29.16 | 31.81 |

TABLE 3

| | Wavelength (nm) | Absorbance at 1 to 10,000 parts dilution |
|---|---|---|
| Comparative Ink 1 | 562 | 0.1125 |
| Comparative Ink 2 | 564 | 0.0945 |

Comparative Ink Compositions 1-2

Comparative ink composition 1 is a dye-based magenta ink isolated from an HP72 magenta ink cartridge, available from Hewlett-Packard.

Comparative ink composition 2 is a pigment-based magenta ink isolated from an HP70 magenta ink cartridge, available from Hewlett-Packard.

Comparative ink composition 3 is a dye-based magenta ink, printed from an HP78 cartridge available from Hewlett-Packard.

Inventive Print Sample 2

Inventive print sample 1 was prepared by using a Calligraphy Lettering set, available from Speedball Art Products of Statesville, N.C. The flat tipped C-1 nib, 27.6 mm wide was dipped into Inventive Ink composition 1 to produce inventive print sample 1. Inventive print sample 1 comprised 4 to 6 parallel lines with ink-free regions therebetween onto Hammermill Fore DP paper. A clear ruler was used to keep the lines straight and aid in consistent ink coverage. The properties of the inventive print sample 1 were tested at 24 hours. The results are described in Table 4.

Inventive Print Sample 1 and 3

Inventive print samples 1 and 3 were prepared according to the following process. An HP45 black pigmented ink cartridge was purchased. The original ink was removed by pushing the steel ball bearing into the pen and removing the ink with a long needle. The cartridge was then washed with DI water until water removed from the pen showed little to no color when dropped on a white paper towel. Water was allowed to flow through the nozzles by pressing the snout of the pen against a paper towel until the water showed little to no color.

Inventive ink compositions 1 and 4 were each pulled up into a syringe with a long needle, and then inserted into the cleaned HP45 cartridge. The steel ball was then pressed into the ink entry port until it was flush with the body of the ink cartridge. The cartridge was then placed nozzles down on wet paper towel for approximately 10 minutes. The refilled HP 45 ink cartridge was placed into an hpdeskjet 940c printer to produce the inventive print sample 1 and 3. A test plot (created in MS Word) of parallel ink lines with no ink coverage between the lines was printed onto Staples Copy Paper (20 lb (75 g/m2), 92 bright). The prints were made in normal plain paper mode. The prints were allowed to dry for 24 hrs and tested for highlighter smear, drip and wet smudge. The results are reported in Table 4.

Comparative Print Sample 1

Comparative print sample 1 was prepared by using a Calligraphy Lettering set, available from Speedball Art Products of Statesville, N.C. The flat tipped C-1 nib, 27.6 mm wide was dipped into comparative ink composition 1 to produce comparative print sample 1 comprised 4 to 6 parallel lines with ink-free regions therebetween onto Hammermill Fore DP paper. A clear ruler was used to keep the lines straight and aid in consistent ink coverage. The properties of the comparative print sample 1 were tested at 24 hours. The results are reported in Table 4.

Comparative Print Samples 2-3

Comparative print samples 2-3 were prepared according to the following process. An HP45 black pigmented ink cartridge was purchased. The original ink was removed by pushing the steel ball bearing into the pen and removing the ink with a long needle. The cartridge was then washed with DI water until water removed from the pen showed little to no color when dropped on a white paper towel. Water was then allowed to flow through the nozzles by pressing the snout of the pen against a paper towel until the water showed little to no color.

Comparative ink compositions 2 and 3 were each pulled up into a syringe with a long needle, and then inserted into the cleaned HP45 cartridge. The steel ball was then pressed into the ink entry port until it was flush with the body of the ink cartridge. The cartridge was then placed nozzles down on wet paper towel for approximately 10 minutes. The refilled HP 45 ink cartridge was placed into an hpdeskjet 940c printer to produce the comparative print sample 2 and 3. A test plot (created in MS Word) of parallel ink lines with no ink coverage between the lines was printed onto Staples Copy Paper (20 lb (75 g/m2), 92 bright). The prints were made in normal plain paper mode. The prints were allowed to dry for 24 hrs and tested for highlighter smear, drip and wet smudge. The results are reported in Table 4.

TABLE 4

| Figure | Print Number | Highlighter Smear | Smudge | Drip | Color Strength |
|---|---|---|---|---|---|
| 1 | Comparative Print Sample-1 | Good | Poor | Poor | Good |
| 2 | Inventive Print Sample-2 | Good | Good | Good | Good |
| 3 | Comparative Print Sample-2 | Good | Good | Good | Good |
| 4 | Comparative Print Sample-3 | Good | Medium | Medium | Good |
| 5 | Inventive Print Sample-1 | Good | Good | Good | Medium |
| 6 | Inventive Print Sample-3 | Good | Good | Good | Good |

TEST METHODS

Test methods include the following:
Particle Size Measurement

The average particle size was measured for inventive Examples A to C by a 90 Plus Particle Size Analyzer (Brookhaven Instrument Corporation).

The average particle size was measured for inventive Examples D to Z by a Coulter LS-230 particle size analyzer (Beckman Coulter Corporation).

The 'Drip' Test:

The inked paper sample is clipped at an angle to a workstation non-magnetic copyholder by Fellows of Itasca, Ill. 60143.

Then 100 microliters of deionized water is added at the top of the horizontally oriented lines such that the water runs down between the ink lines and it is possible to see when ink transfer occurs in the ink-free areas between the lines.

The 'Wet Smudge' Test:

Slightly to the side of the drip test, an additional 100 microliters of deionized water is allowed to run across the ink bars followed immediately by the application of pressure down the path of the water by a nitrile gloved index finger. The smudge test can be done with one pass (1×) or with two pass (2×).

The 'Highlighter Smear' Test"

This test is run with the paper laying on a flat surface. Slightly to the side of the wet smudge test, a yellow highlighter is run across the ink lines once (marked 1×).

Next to the 1× test, the highlighter is run across the lines once, then the same path is repeated for two total passes (marked 2×).

Any ink transfer can be observed on the paper between the original ink lines.

Yellow Highlighters:
(1) Staples Hype! Highlighter, part number 10399
(2) Bic brite liner Grip Florescent Highlighter, part number 31289
(3) Pentel recycled Ultra Slim Handy-lines, part number 22873

The present invention may be embodied in other forms without departing from the spirit and the essential attributes thereof, and, accordingly, reference should be made to the appended claims, rather than to the foregoing specification, as indicating the scope of the invention.

We claim:

1. A method for producing a dye-encapsulated dispersion suitable for printing applications comprising the steps of:
selecting one or more linear or branched polyesters having an acid number in the range of less than 30 mg KOH/g resin, a Mw in the range of from 4,000 to 100,000, a glass transition temperature Tg in the range of from 50 to 75° C., and a hydroxyl number in the range of less than 50;
selecting one or more water insoluble dyes, wherein said one or more water insoluble dyes are miscible in said one or more linear or branched polyesters;
optionally selecting one or more stabilizing agents; and
melt kneading said one or more linear or branched polyesters, one or more water insoluble dyes and optionally one or more stabilizing agents in the presence of water and optionally one or more neutralizing agents;
thereby forming an emulsified mixture;
diluting said emulsified mixture with additional water and optionally removing heat therefrom;
thereby forming solid particles dispersed in water;
wherein said dye-encapsulated dispersion has an average volume particle size in the range of from 0.05 to 0.5 micrometer, a total solid content in the range of from 15 to 65 percent based on the total weight of the dispersion, and wherein the dispersion comprises 60 to 97 percent by weight of one or more linear or branched polyesters and 3 to 40 percent by weight of one or more water insoluble dyes, based on the weight of total solid content.

* * * * *